United States Patent [19] [11] Patent Number: 4,592,207
Rummel [45] Date of Patent: Jun. 3, 1986

[54] AIR CONDITIONING SYSTEM FOR MOUNTING ON MOTOR VEHICLES

[75] Inventor: Wolfram Rummel, Saebenerstr, Fed. Rep. of Germany

[73] Assignee: Webasto-Werk W. Baier GmbH & Co., Fed. Rep. of Germany

[21] Appl. No.: 739,290

[22] Filed: May 30, 1985

[30] Foreign Application Priority Data

Jun. 1, 1984 [DE] Fed. Rep. of Germany ....... 3420533

[51] Int. Cl.⁴ .............................................. B60H 3/04
[52] U.S. Cl. ................................ 62/244; 62/DIG. 16
[58] Field of Search .............. 62/239, 244, 428, 259.1, 62/DIG. 16

[56] References Cited

U.S. PATENT DOCUMENTS

| | | | |
|---|---|---|---|
| 2,075,389 | 3/1937 | Eubank | 62/241 |
| 2,799,143 | 7/1957 | Weigel | 62/244 X |
| 3,315,488 | 4/1967 | Lind | 62/259.1 X |
| 3,417,576 | 12/1968 | Stucky | 62/244 |
| 3,670,808 | 6/1972 | Walt, Jr. | 62/428 X |
| 4,098,093 | 7/1978 | Czyl | 62/244 X |
| 4,144,719 | 3/1979 | Williams et al. | 62/244 X |
| 4,201,064 | 5/1980 | Krug et al. | 62/244 X |
| 4,217,764 | 8/1980 | Armbruster | 62/244 X |

Primary Examiner—William E. Tapolcai
Attorney, Agent, or Firm—Sixbey, Friedman & Leedom

[57] ABSTRACT

An air conditioning system for roof mounting on motor vehicles having a compact design, and a favorable ratio of performance density, whereby such air conditioning system is cost-effective for retrofit and maintenance purposes. The air conditioning system has a large surface condenser block of the condenser part, arranged between the evaporator blocks of the evaporator part, resulting in a nest effect design of the condenser part and evaporator part. In order to ensure low resistance discharge of the condenser part's exhaust, and to further ensure uniform admission of circulating air to the entire height and length of the evaporator block, a specifically designed trough-shaped housing part is provided, which serves to transversely separate the evaporator part and the condenser part. Such a design of the air conditioning system reduces the dimensions of the assembly's height extending above the vehicle roof to a minimum.

20 Claims, 6 Drawing Figures

AIR CONDITIONING SYSTEM FOR MOUNTING ON MOTOR VEHICLES

BACKGROUND AND SUMMARY OF THE INVENTION

The invention relates to a roof-mounted air conditioning system for motor vehicle use.

As described in an earlier application of the same assignee (U.S. patent application Ser. No. 703,991, filed Feb. 21, 1985), an air conditioning system, particularly intended for buses comprises the following: a condenser part having a large surface condenser block which is downwardly inclined and is transversely extending, relative to a forward driving direction, and a condenser blower for discharging exhaust air from the condenser. This system also comprises an evaporator part separated from the condenser part by a transversely extending part, and evaporator blocks separated from each other, in parallel, relative to a forward driving direction. The evaporator part also comprises an air intake space and an evaporator blower which distributes circulating air, drawn in by an air intake device, as cooled air to the passenger space of the vehicle, after its passage through the evaporator past.

The air conditioning system according to assignee's previous application is designed to achieve a relatively low overall height above the roof of the vehicle. To this end, the air conditioning system can be integrated into the framework of the roof. The condenser part, together with the large surface condenser block, which is downwardly inclined relative to a forward driving direction, is partially lowered at the rear section of the vehicle roof so that it extends below the roof level.

On the basis of German Offenlegungsschrift No. 32 24 895, an air conditioning unit is known which is specifically intended for roof mounting on buses. This air conditioning system has a flat construction, in which a condenser and an evaporator are arranged behind one another, relative to a forward driving direction, and are mounted on the roof, and trough-shaped elements, housing the condenser and evaporator parts, are adapted to the contour of the roof.

German Offenlegungsschrift No. 27 57 415 discloses an air conditioning system for roof mounting in which the condenser block has an upright configuration or is upwardly inclined at a steep angle, relative to a forward driving direction. However, this arrangement presents difficulties in accommodating the large heat exchanger surfaces of the condenser that are necessary for achieving relatively high cooling performances. Because the length of the condenser block is predetermined by the maximum vehicle width and an increase in the depth of the condenser block causes the rear row of pipes to contribute, proportionately, only a very small amount to the total output. As a result, the ratios of weight, price and performance of the condenser are unfavorable. The resultant increase in the condenser's resistance to air flow requires the use of blowers with higher performance to counteract such an increased resistance effect, which in turn, adds to the weight and cost of the system.

German Gebrauchsmuster No. 77 14 617 discloses yet another air conditioning system for roof mounting which has two parallel condenser blocks extending in a forward driving direction. Since the available height is limited, the heat exchanger surfaces can only be expanded by extension of their length or depth. This, in turn, necessitates relatively deep condenser blocks. Additionally, air deflection is necessary to overcome the problem of an increased air flow resistance in the condenser part.

It is a primary objective of the present invention to provide a roof-mounted air conditioning system for vehicles of the type mentioned, having a design which is more compact, smaller, flatter and lighter in weight as well as with a favorable ratio of high power density to a small structural volume.

A further object of the invention is to provide an air conditioning system which will be cost-effective for purposes of retrofit installation and maintenance purposes.

The air conditioning system of the invention meets the above objectives, in accordance with embodiments of the invention, by providing an inclined condenser block having an uppermost edge that is approximately flush with the upper edge of the evaporator block.

In accordance with an essential feature of the invention, the condenser, with the downwardly inclined condenser block, is arranged between the evaporator blocks of the evaporator part, in order to reduce the overall height and to enhance compactness of the system.

The arrangement with the uppermost edge of the evaporator block being approximately flush with the uppermost edge of the condenser block results in a nested effect. This nested arrangement of the condenser part and the evaporator part reduces the overall height of the air conditioning system as well as the entire overall volume thereof, and thereby achieves a high performance density with an overall small volume. Furthermore, the air conditioning system is designed in such a way that, independent of the performance requirements of the air conditioning system, the basic arrangement is symmetrical about a longitudinally extending line, i.e., relative to a forward driving direction of the motor vehicle. While the dimension of the condenser blocks, as well as the condenser parts, and/or the evaporator blocks or evaporator parts vary depending upon the performance requirements, the basic construction of the housing can, however, be selected to be the same for all performance capacities, independent of performance requirements. The only modification necessary is the complement of the condenser block, evaporator blocks and blowers. Such a design facilitates cost-effective production and even a reduction in manufacturing costs. The compact construction of the inventive air conditioning system reduces its weight as compared to conventional systems, resulting in a saving of total net weight.

A preferred feature of the invention is the manner in which a trough-shaped housing part transversely separates the condenser and the evaporator parts. This separation is designed, with a view to a favorable performance ratio, in such a way that, regardless of the compact construction and the nested arrangement of the condenser and evaporator parts, the space available at the exhaust side of the condenser part facilitates easy discharge of exhaust air by way of the condenser blower, unhampered by significant flow resistance. As a consequence, only a limited number of small size condenser blowers have to be provided in the area of the exhaust side of the condenser. Due to the fact that the condenser block is placed in an extremely flat position between the evaporator blocks, its operation is enhanced by the resulting dynamic pressure, and the trough-shaped housing part in the area of the discharge side is designed to facilitate the flow of the exhaust air.

The trough-shaped housing part, is further shaped in such a way that almost the entire area of the evaporator can be utilized for the cooling of the circulating air, which enhances admission of air to the evaporator blocks over their entire length and height with the utmost uniformity. When the length and height of the evaporator blocks are almost entirely utilized, the dimensions of the blocks can be adjusted to conform to desired performance requirements without consideration to design-dependent reductions in performance.

It has also proven advantageous to design the trough-shaped housing part so that it forms a U-shape in cross section. Such a configuration facilitates the installation and support of the inclined condenser blocks in the trough-shaped housing, while simultaneously providing a space in the area of the circulating air inlet of the condenser part, which is enables circulating air to be admitted over the entire height of evaporator block.

A preferred variation of the bottom wall of the trough-shaped housing part, i.e., that part of the housing part which extends longitudinally (parallel) to the evaporator blocks, is profiled so as to form an expanding outlet space. This bottom wall faces the circulating air inlet of the evaporator part. The bottom wall of the trough-shaped housing part defines the outlet expansion space, in the direction of the exhaust flow, in a manner for attaining minimum resistance to discharge of exhaust from the condenser part. In this manner, the exhaust can be discharged under favorable flow conditions to optimally utilize the output of the condenser block.

The bottom side of the trough-shaped housing extends into the area of the lower end of the condenser block approximately parallel to the angle of the condenser block, and at a distance from it which is adequate to facilitate the discharge of the exhaust from the condenser block. At the same time, this configuration of the bottom wall of the trough-shaped housing part in the area of the condenser block's lower end is chosen in such a manner that circulating air is admitted along the entire length of the evaporator blocks.

The bottom side of the trough-shaped housing is profiled so that when sectioned longitudinally, it defines an approximately trapezoidal circulating air inlet for admission of circulating air to the evaporator blocks. In order to render the discharge of exhausted air from the condenser part more favorable in the flow direction, without impairing admission of air to the evaporator blocks, and in order to expand the capacity of the expansion space, the trough-shaped housing part has a reinforcing crease at the bottom which extends longitudinally.

The evaporator blocks have a shorter length than the condenser block such that the condenser block, at its inlet side, protrudes beyond the evaporator blocks and, preferably, this area is wedge-shaped in order to enhance the dynamic pressure for support of the condenser part and to, furthermore, avoid additional wind noise.

A preferred arrangement of the condenser blowers at the discharge side of the condenser enables, depending upon the intended use of the air conditioning system, blowers to be selected to assure reliable operation of the system, while keeping the dimensions thereof as small as possible.

The evaporator blowers have a horizontally disposed axis, i.e., parallel to the evaporator blocks and in a longitudinal direction thereto. This arrangement permits a space-saving accommodation of the evaporator blowers in the evaporator part with a resultant design width of the air conditioning system.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
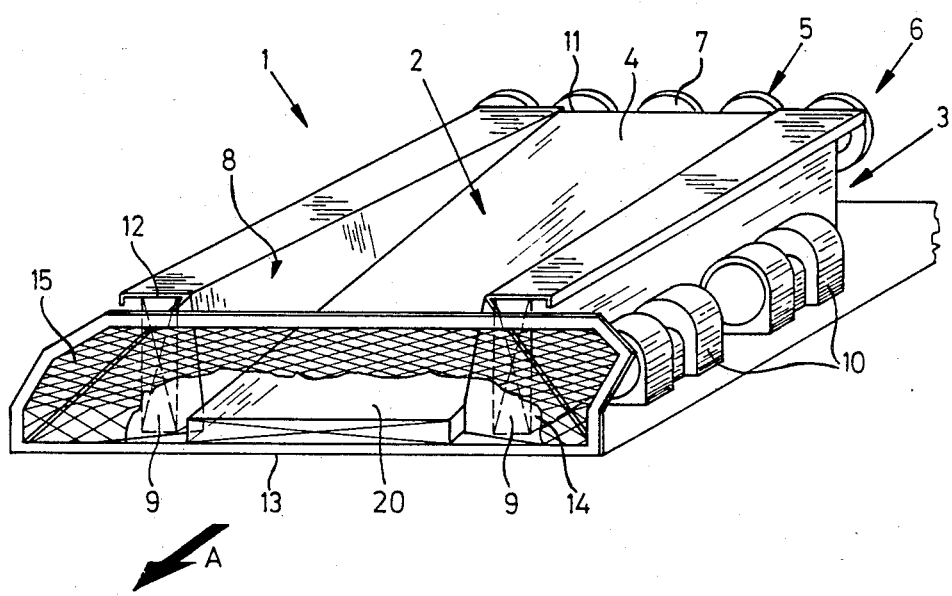
FIG. 1 is a perspective view of an air conditioning system for mounting on motor vehicles in accordance with a preferred embodiment of the invention.
Figure 2:
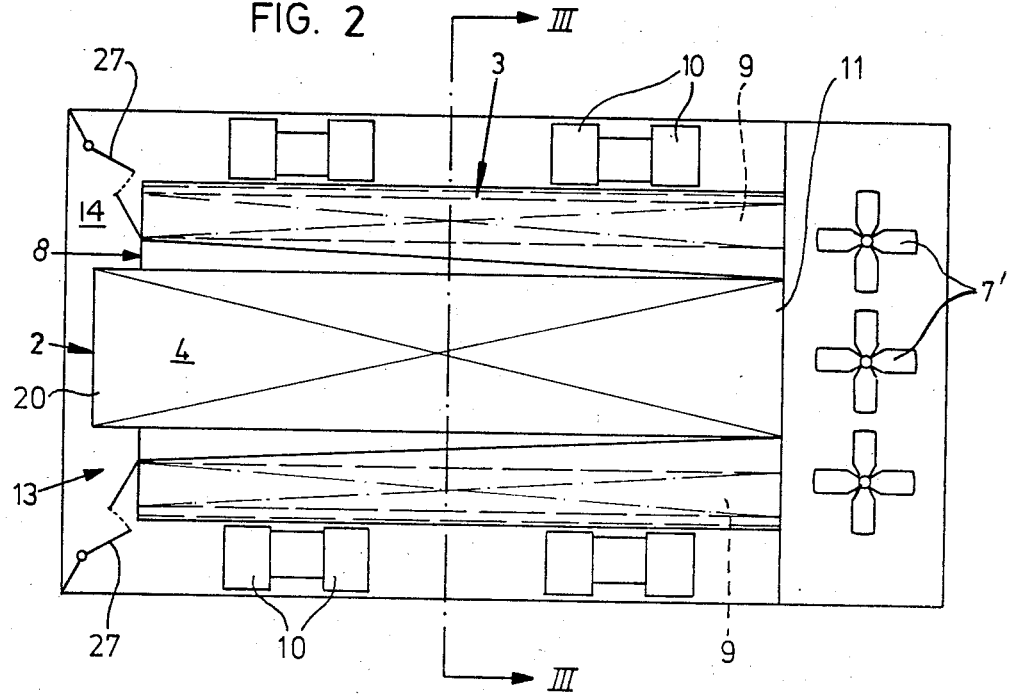
FIG. 2 is a top view of a variation of the inventive design of the air conditioning system.

FIG. 1 shows a perspective view of an air conditioning system which is designed to be mounted, as a unit, onto the roof of a motor vehicle. Air conditioning system 1 comprises a conventional condenser part 2 and an evaporator part 3. Condenser part 2 comprises a large surface condenser block 4 extending transversely and in a forward driving direction (indicated by letter A in FIG. 1). Condenser blowers 5, which are arranged at discharge side 6 of condenser part 2 of the air conditioning system 1, are provided for discharge of condenser exhaust. In the example depicted in FIG. 1, condenser blowers 5 are horizontally arranged axial blowers 7. Instead of horizontally arranged axial blowers 7, vertically arranged axial blowers 7' can be used so that the exhaust of condenser part 2 at discharge side 6 is passed off approximately normal to forward driving direction A (see FIGS. 2 and 5). Instead of axial blowers 7, 7', radial flow blowers 25 can be used (see FIG. 6), which may be either horizontally or vertically oriented. The selection of the arrangement and design of condenser blowers 5 can be made according to the particular conditions at hand in each use requirement, with the ultimate aim being to achieve a compact design combined with a high performance density.

Condenser part 2 and evaporator part 3 are transversely separated from each other by a trough-shaped housing part 8. This trough-shaped housing part 8 and its design are further described in connection with FIGS. 2-5.

Preferably, evaporator part 3 has two evaporator blocks 9 which extend parallel to forward driving direction A at a predetermined distance from each other. Evaporator part 3 also comprises evaporator blowers 10 which supply the incoming circulating air, after its passage through evaporator part 3 and evaporator blocks 9, as cooled air to the interior passenger area of a motor vehicle 30. Evaporator blowers 10 preferably are double radial flow blowers.

As can be seen from FIG. 1, the large surface condenser block 4 of condenser part 2, is downwardly inclined in forward driving direction A, and is arranged between evaporator blocks 9 of evaporator part 3. The arrangement is such that the uppermost edge 11 of evaporator block 4 is approximately flush with the uppermost edge 12 of evaporator blocks 9. Relative to forward driving direction A, evaporator blocks 9 are of a shorter dimension than large surface condenser block 4, so that condenser block 4 protrudes beyond evaporator blocks 9, at inlet side 13 of system 1. In the area of inlet side 13, in which the protruding end of condenser block 4 is provided, a longitudinally wedge-shaped space 14 is formed by housing part 8 in order to enhance the dynamic air pressure effect of air entering the condenser part and to, furthermore, avoid additional wind noise. The parts of housing part 8 defining wedge-shaped space 14 may be triangular heightwise (FIG. 1) to admit fresh air upstream of the evaporator blocks or may be full-height with adjustable flaps 27 (FIG. 2) for controllable admitting fresh air upstream of the evaporator, from which point blowers 10 may feed it to the passenger area 30.

Air grid 15 protectively covers the opening at inlet side 13 of air conditioning system 1. The outer cover encloses the top and lateral sides of air conditioning system 1, but is not depicted in order to more clearly illustrate the interior components of air conditioning system 1 in FIG. 1. Preferably, the shape of the cover is designed to be adaptable to the roof contour so as to make the exterior appearance of the air conditioning system visually appealing.

Figure 3:
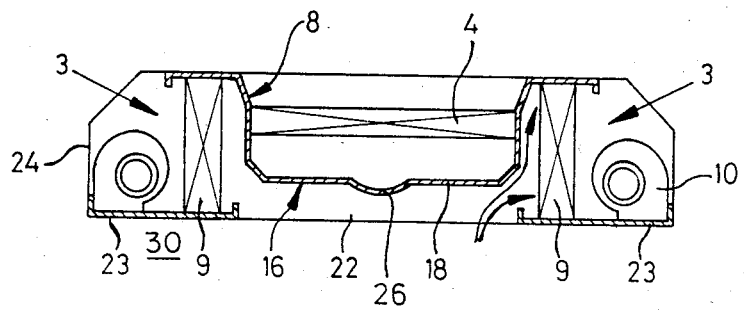
FIG. 3 is a cross sectional view of the system along line III—III in FIG. 2 to depict the arrangement of the condenser and evaporator part.
Figure 4:
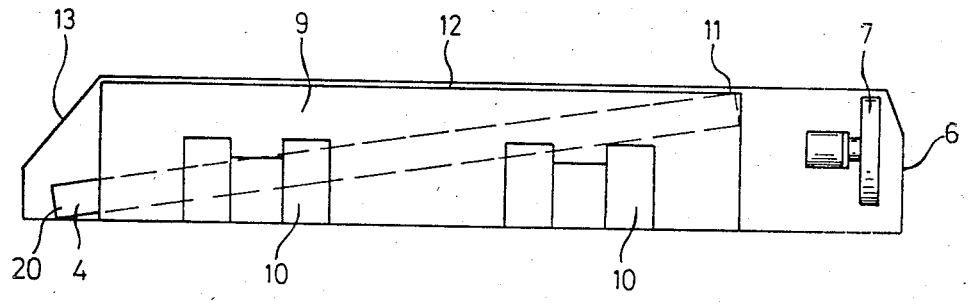
FIG. 4 is a side view of the system according to FIG. 1, with the cover removed.

FIG. 3 shows, in a cross-sectional view of air conditioning system 1, a trough-shaped housing part 8, which part encloses the lower part of condenser block 4. As shown, trough-shaped housing part 8 is cross-sectionally U-shaped, and the bottom wall 16 of the U-shaped cross section of housing part 8 faces circulating air inlet 22, which is associated with evaporator part 3.

Due to the configuration of trough-shaped housing part 8, evaporator blocks 9 can be acted upon with circulating air over their entire length and height (see arrows in FIG. 3), and, additionally, the flow of exhaust air at the discharge side of condenser part 2 can be unrestricted.

Figure 5:
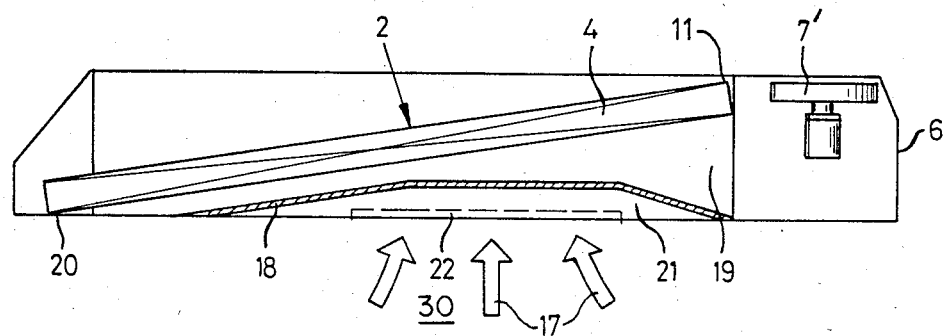
FIG. 5 is a longitudinal view across the air conditioning system without the evaporator blocks to clearly show the profiling of the bottom wall of the trough-shaped housing part.
Figure 6:
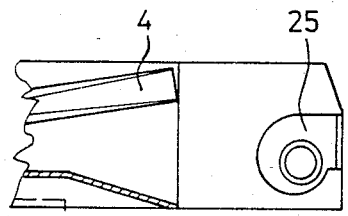
FIG. 6 is a sectional view of another variation of the invention.

As can be seen from FIGS. 3 and 5, bottom side 18 of trough-shaped housing part 8, in a longitudinal direction parallel to the evaporator blocks 9, is profiled in such a way that it forms an expanding outlet space 19 in the area of discharge side 6 of condenser part 2, (specifically depicted in FIG. 5). This expanding outlet space 19 causes a reduction in air resistance of the exhaust, at discharge side 6 of condenser part 2.

In the area of lower end 20 of condenser block 4, bottom side 18 of wall 16 of trough-shaped housing part 8 is spaced apart from and extends approximately parallel to, the depicted inclination of condenser block 4.

According to a preferred variation for trough-shaped housing part 8, depicted in FIG. 5, bottom side 18, in longitudinal section, defines an approximately trapezoidal circulating air inlet space 21 into which circulating air being passed through evaporator blocks 9 is admitted.

In accordance with FIG. 3, the bottom side 18 of trough-shaped housing part 8, can be provided with a reinforcing crease 26 that expands into outlet space 19 in the area of discharge side 6 of condenser part 2 (FIG. 5).

Broken lines in FIG. 5 indicate the circulating air inlet 22, which communicates with the vehicle interior area 30. The flow of circulating air 17 is schematically indicated by arrows.

The arrangement of evaporator blowers 10 depicted in FIGS. 1-4, shows several evaporator blowers 10 parallel to a longitudinal extension of evaporator blocks 9. These evaporator blowers 10 have air outlet openings 23 vertically disposed in the direction toward the interior passenger area 30. An arrangement of evaporator blowers 10 in this manner makes it possible to optimally utilize the space between evaporator blocks 9 and outer cover wall 24 of air conditioning system 1.

Although not depicted in detail, evaporator blocks 9 may have heating elements upstream, in the air flow direction relative to evaporator blowers 10, for heating the cooled air after its passage through evaporable blocks 9, and before its return to the interior passenger area via evaporator blowers 10. Thus, air conditioning system 1, in accordance with the invention, can also be equipped so that not only cooling, but also other conditioning of incoming circulating air 17 can be achieved.

Air conditioning system 1 depicted in FIGS. 1-5 of the drawing is compact, small, flat and of light-weight design which promotes a favorable ratio of high performance density to small design configuration. Air conditioning system 1 can easily be adapted to a given performance requirement depending upon the size selection of evaporator blocks 9 and/or condenser block 4. This system operates as follows.

In the orientation of air conditioning system 1, relative to the forward driving direction indicated by arrow A, depicted in FIG. 1, its operation is enhanced by dynamic pressure. Thus, external air enters via air grid 15 and acts upon the entire surface of large surface condenser block 4 to cool condenser block 4. After passing condenser block 4, exhaust air exits via discharge side 6 and is passed off into the atmosphere. Circulating air 17 leaves the passenger interior via circulating air inlet 22 and enters circulating air inlet space 21, which is formed between trough-shaped housing part 8 and evaporator blocks 9. The circulating air thus admitted, passes evaporator blocks 9, and, if provided, passes the heating elements (not depicted), and is subsequently returned by evaporator blower 10 to the interior passenger space in the form of cooled air to the interior passenger.

While I have shown and described various embodiments in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. An air conditioning system for roof mounting on a motor vehicle, having a condenser part which comprises a condenser block with a large surface that is downwardly inclined in a direction that, in an installed condition of the system, corresponds to a forward driving direction of the motor vehicle, and condenser blowers for discharging condenser exhaust; and evaporator part which comprises evaporator blocks extending, at a distance from each other, in parallel to a direction which, in said installed condition, corresponds to said forward driving direction, and evaporator blowers for supplying air to a passenger interior area of the vehicle, after its passage through the evaporator part; wherein the condenser part is arranged between evaporator blocks of the evaporator part, in such a way that an uppermost edge of the condenser block is approximately flush with an upper edge of the evaporator block, and with a trough-shaped housing part transversely separating the evaporator part from the condenser part in a manner providing an air inlet space for admission of air from the interior area of the vehicle to said evaporator blocks.

2. Air conditioning system according to claim 1, wherein the trough-shaped housing part receives the condenser block, and is configured in a manner to enable the air inlet space to admit air to the evaporator blocks over their entire length and height and to provide a low resistance to condenser exhaust flow at a discharge side of the condenser part.

3. Air conditioning system according to claim 2, wherein the trough-shaped housing part is generally U-shaped in transverse cross section and has a bottom wall facing a circulating air inlet of said air inlet space.

4. Air conditioning system according to claim 3, wherein the bottom wall of the trough-shaped housing part is profiled such that it forms an expanding outlet space in the area of the discharge side of the condenser for providing said low resistance to condenser exhaust flow.

5. Air conditioning system according to claim 3, wherein the bottom wall of the trough-shaped housing part extends at a distance from and approximately parallel to the downwardly inclined surface of condenser block in an area of a lower end portion thereof.

6. Air conditioning system according to claim 5, wherein said bottom wall defines, at least in the vicinity of said evaporator blocks, an approximately trapezoidal longitudinal cross-sectional shape for the air inlet space.

7. Air conditioning system according to claim 4, wherein said bottom wall of the trough-shaped housing part has a longitudinal reinforcing crease that expands into said outlet space in the discharge area of the condenser part.

8. Air conditioning system according to claim 5, wherein the evaporator blocks have a shorter length than the condenser block which is arranged therebetween, and wherein the condenser block protrudes beyond said evaporator blocks at an inlet side of the condenser block.

9. Air conditioning system according to claim 8, wherein the trough-shaped housing part defines a wedge-shaped space in the area of said inlet side of the condenser, between the protruding end of the condenser block and the evaporator blocks.

10. Air conditioning system according to claim 9, wherein axial blowers are arranged, as said condenser blowers, at the discharge side of the condenser part.

11. Air conditioning system according to claim 9, wherein radial flow blowers are arranged, as said condenser blowers, at the discharge side of the condenser part.

12. Air conditioning system according to claim 8, wherein said evaporator blowers are arranged in parallel to a longitudinal extent of the evaporator blocks, with air outlet openings thereof oriented in a direction which is vertical.

13. Air conditioning system according to claim 2, wherein the trough-shaped housing part has a bottom wall that defines, at least in the vicinity of the evaporator blocks, an approximately trapezoidal longitudinal cross-sectional shape for the air inlet space.

14. Air conditioning sysstem according to claim 13, wherein said bottom wall of the trough-shaped housing part has a longitudinal reinforcing crease that expands into an outlet space in the discharge area of the condenser part.

15. Air conditioning sysstem according to claim 14, wherein the evaporator blocks have a shorter length than the condenser block which is arranged therebetween, and wherein the condenser block protrudes beyond said evaporator blocks at an inlet side of the condenser block.

16. Air conditioning system according to claim 15, wherein the trough-shaped housing part defines a wedge-shaped space in the area of said inlet side of the condenser, between the protruding end of the condenser block and the evaporator blocks.

17. Air conditioning system according to claim 4, wherein the bottom wall of the trough-shaped housing part extends at a distance from and approximately parallel to the downwardly inclined surface of condenser block, in an area of a lower end portion thereof.

18. Air conditioning system according to claim 4, wherein said bottom wall defines, at least in the vicinity of evaporator blocks, an approximately trapezoidal longitudinal cross-sectional shape for the air inlet space.

19. Air conditioning system according to claim 2, wherein the evaporator blocks have a shorter length than the condenser block which is arranged therebetween, and wherein the condenser block protrudes beyond said evaporator blocks at an inlet side of the condenser block.

20. Air conditioning system according to claim 19, wherein the trough-shaped housing part defines a wedge-shaped space in the area of said inlet side of the condenser, between the protruding end of the condenser block and the evaporator blocks.

* * * * *